United States Patent [19]

Gerling et al.

[11] Patent Number: 5,738,153

[45] Date of Patent: Apr. 14, 1998

[54] MEASURING AND DISPENSING SYSTEM FOR SOLID DRY FLOWABLE MATERIALS

[75] Inventors: Joseph Francis Gerling, West Grove, Pa.; Paul Allen Nolte, Memphis, Tenn.; Laurence Alfred Shaul, Wilmington, Del.

[73] Assignee: E. I. du Pont de Nemours and Company, Wilmington, Del.

[21] Appl. No.: 740,813

[22] Filed: Nov. 1, 1996

Related U.S. Application Data

[60] Provisional application No. 60/007,226 Nov. 3, 1995.

[51] Int. Cl.⁶ ............................................. B65B 1/04
[52] U.S. Cl. .................... 141/83; 141/94; 141/100; 141/192; 141/346; 222/23; 222/63; 137/552
[58] Field of Search .................... 141/83, 98, 94, 141/97, 18, 102, 100, 192, 346–352, 360–362, 367, 383, 386, 2; 222/63, 23, 30; 137/552; 177/53

[56] References Cited

U.S. PATENT DOCUMENTS

| | | | |
|---|---|---|---|
| 4,054,784 | 10/1977 | Ricciardi et al. | 364/479 |
| 4,660,742 | 4/1987 | Ozdemir | 222/63 |
| 5,029,624 | 7/1991 | McCunn et al. | 141/346 |
| 5,038,973 | 8/1991 | Gmur | 222/56 |
| 5,191,919 | 3/1993 | Barrows et al. | 141/2 |
| 5,322,095 | 6/1994 | Bolz | 141/83 |
| 5,456,297 | 10/1995 | Crossdale et al. | 141/83 |
| 5,566,732 | 10/1996 | Nelson | 141/94 |
| 5,586,589 | 12/1996 | Voelker | 141/349 |
| 5,641,011 | 6/1997 | Benedetti, Jr. et al. | 141/346 |

FOREIGN PATENT DOCUMENTS

| | | | |
|---|---|---|---|
| 0 453 861 A1 | 4/1991 | European Pat. Off. | A01C 17/00 |
| 2213031 | 8/1989 | United Kingdom | A01C 23/00 |

*Primary Examiner*—Henry J. Recla
*Assistant Examiner*—Steven O. Douglas

[57] ABSTRACT

An apparatus for measuring and dispensing solid dry flowable materials, comprising a refill container, hopper, dispensing valve, transfer container, load cell and controller. The refill container and the transfer container are each mechanically and/or electronically keyed to a specific product.

10 Claims, 5 Drawing Sheets

MEASURING AND DISPENSING SYSTEM FOR SOLID DRY FLOWABLE MATERIALS

This application claims the priority benefit of U.S. Provisional Application 60/007,226, filed Nov. 3, 1995.

FIELD OF THE INVENTION

The present invention relates to a system for measuring and dispensing solid dry flowable materials. More particularly, the present invention relates to apparatus for measuring and dispensing dry flowable agricultural products in a way that the product can only be dispensed into a preferred container.

BACKGROUND OF THE INVENTION

Apparatus and devices for handling granular chemicals have been developed for a variety of purposes. U.S. Pat. No. 5,029,624 discloses a closed granular chemical handling system comprising a dispensing valve and a receiving valve that are configured to operate in a desired sequence. U.S. Pat. No. 4,054,784 discloses a weigh feeder system including a device for controllably discharging a substance from a container and apparatus for weighing the container.

SUMMARY OF THE INVENTION

An apparatus for measuring and dispensing solid dry flowable materials, comprising:

a refill container having material;

a hopper connected to said refill container by a transfer valve;

a transfer container;

a control valve connected to said hopper and said transfer container to regulate materials flow therebetween; and, a weighing device supporting said transfer container;

and means for identifying said containers and regulating flow of appropriate materials thereinto, is disclosed herein.

BRIEF DESCRIPTION OF THE DRAWINGS

The invention can be more fully understood upon having reference to the accompanying drawings described as follows.

DETAILED DESCRIPTION OF THE INVENTION

Figure 3:
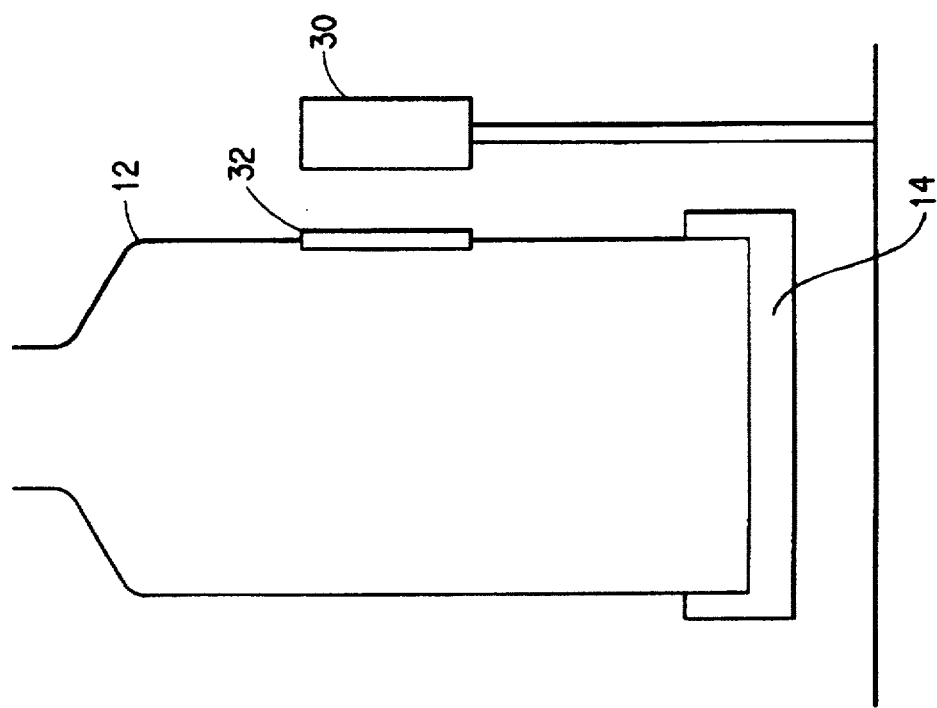
FIG. 3 is an illustration of the electronically keyed transfer container.
Figure 4:
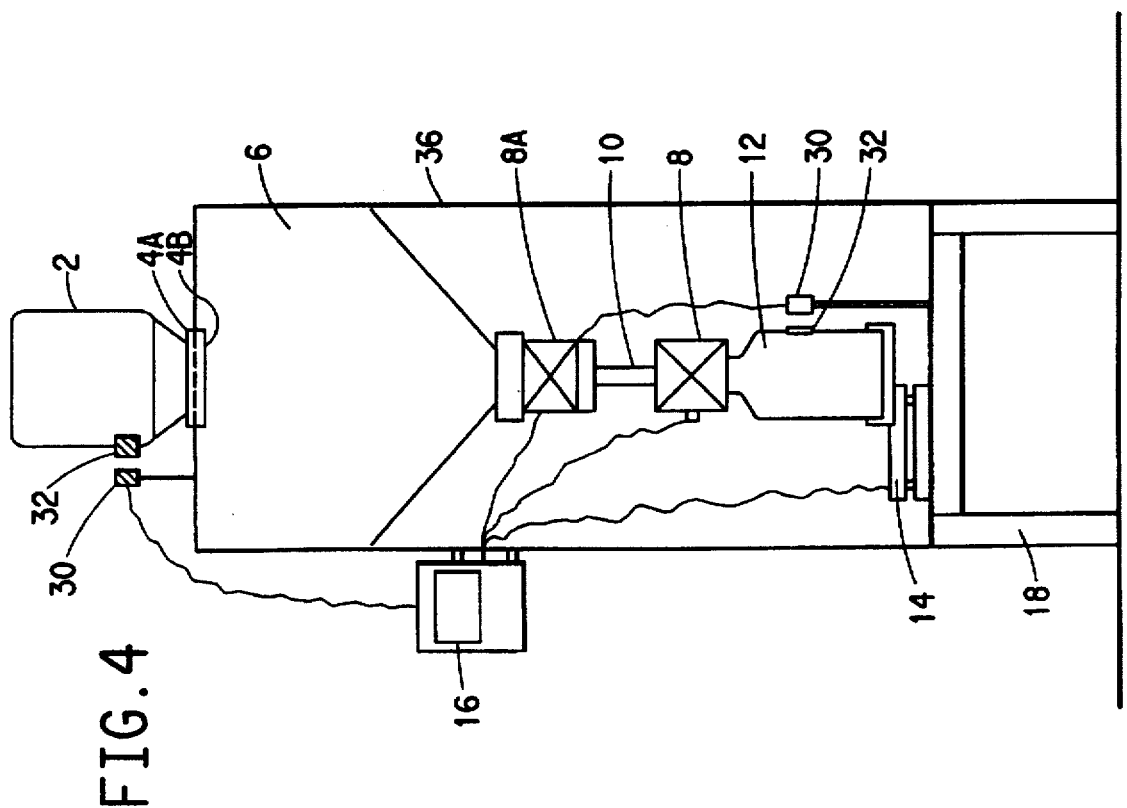
FIG. 4 is a front elevation view of a single unit of the measuring and dispensing system.

This invention can be more fully understood from the following detailed description of the invention. Having reference to FIG. 4, there is shown a single unit system useful for measuring and dispensing solid dry flowable materials. The measuring and dispensing system comprises a refill container 2 which is transportable and environmentally closed (as defined herein) with an output transfer valve 4a which is used to refill the hopper 6 and is product specific. The hopper 6 is environmentally closed and is attached to an input transfer valve 4b to receive the product from the refill container 2. The refill container 2 is transportable and environmentally sealed. A dispensing valve 8 allows the product to flow out of the hopper 6 through associated piping 10 and into the transfer container 12 which is also mechanically and/or electronically keyed to a specific product (see FIG. 3). Manual shutoff valve 8A will be described in conjunction with FIG. 6. A weight measurement device 14 measures the weight of material being dispensed into the product transfer container 12. The weight measurement device 14 illustrated herein is a 10K loadcell #MS4010 from measurement specialists of Palm Bay, Fla. Those skilled in the art will readily appreciate that other devices may be used. A controller 16 is interfaced with the dispensing valve 8, the weight measurement device 14 and the sensors 30 (located approximate to sensor chips 32 attached to the refill container 2 and the product transfer container 12). The controller 16 regulates the flow through the dispensing valve 8 as a function of weight in order to accurately dispense a predetermined amount of a specific product into the transfer container 12. Additionally, using transfer containers 12 with a known tare weight, the controller 16 (preprogrammed with the known tare weight) will dispense material only if the tare weight from the weight measurement device 14 matches the tare weight of the transfer container 12. The components of the device are optionally mounted on a frame support 18 and a housing 36 for convenient access and the controller 16 is optionally connected to a computer (not shown). The housing 36 forms a chamber around part of the measuring and dispersing system and can be made of sheet metal, rigid plastic, plexiglass and the like. The frame support may be made of sheet metal, rigid plastic, wood or any sturdy material to support the system.

Figure 1:
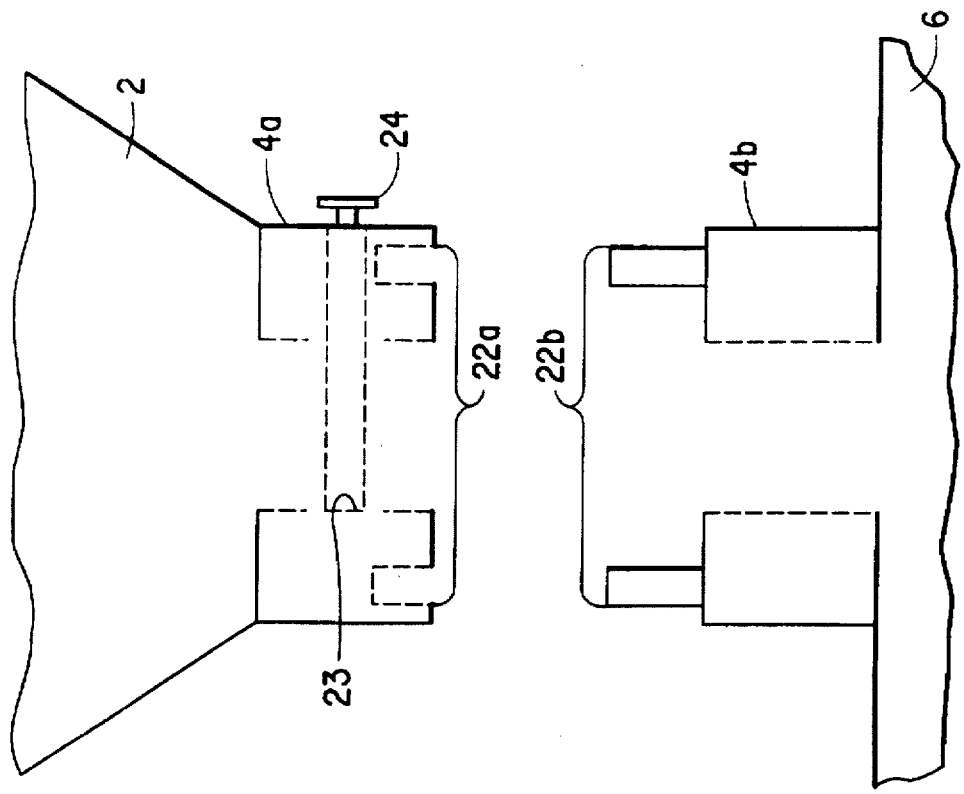
FIG. 1 is an illustration of the mechanically keyed output transfer valve.

Information specific to the mechanically and/or electronically keyed transfer valve is illustrated in FIG. 1. The location and number of pins 22b will allow a refill container 2 with a keyed output transfer valve 4a to seat on the keyed input transfer valve 4b of the hopper 6 via holes 22a.

Once seated, the slide gate 23 can then be opened by means of the slide gate handle 24 to dispense the product into the hopper 6. The arrangement of holes 22a and pins 22b is product specific, thus avoiding unintentionally mixing products.

Figure 2:
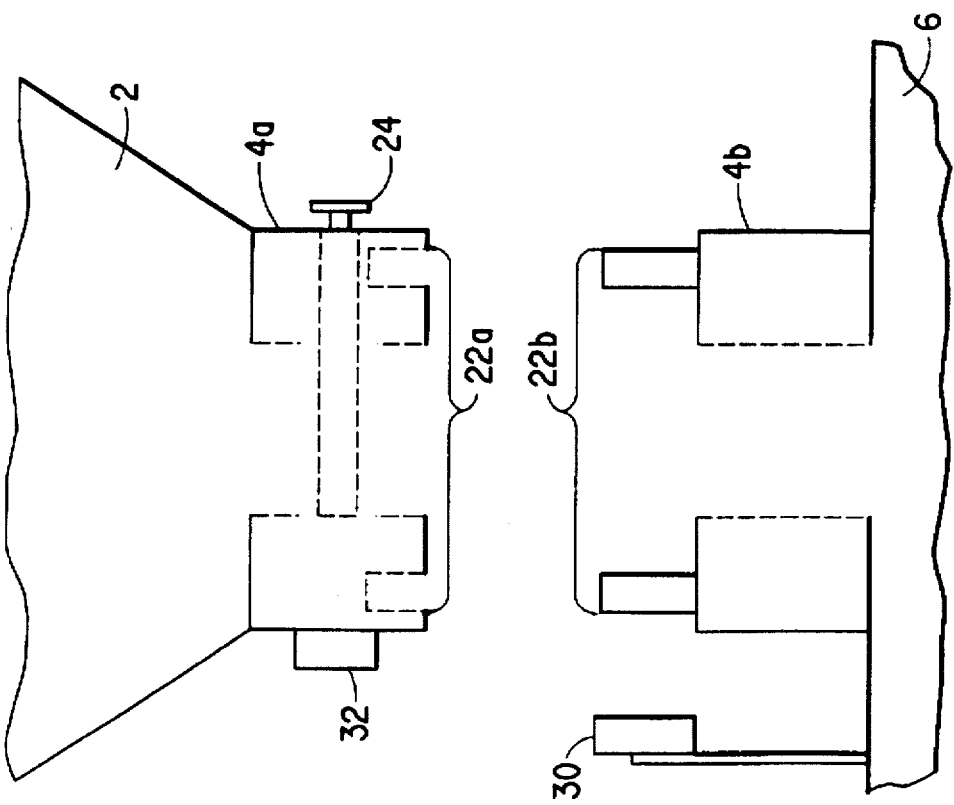
FIG. 2 is an illustration of the electronically keyed output transfer valve.

FIG. 2 further illustrates an electronically keyed output transfer valve 4a. The valve 4a, sensor chip 32, and sensor 30 must be electronically coordinated in a way that would allow product to be dispensed. The system further provides a transfer container 12 which is mechanically and/or electronically keyed to a specific product as described in FIG. 3. As the transfer container 12 supported in a secure fashion on weight measurement device 14 is moved into position the sensor 30 reads the magnetic, resistive, radio frequency or conductive signature of the sensor chip 32 on the transfer container 12. If the conductive signature does not match the sensor 30, then the dispensing cycle will not begin. By dispensing cycle, what is meant is the opening and closing of the dispensing valve 8. The sensor chip 32 (available from Illini Technology, Springfield, Ill.) is programmed to have a unique serial number corresponding to a specific product. Those skilled in the art will readily appreciate that other sensor chips and the like may be used.

The user may select from several types of sensors. The magnetic sensors are a series of individual magnets that can be in place or not. The pattern of in place or not is what is sensed. Resistive sensors measure the resistance of a circuit on the transfer container. Radio frequency sensors measure a preset frequency. Capacitance sensors measure the capacitance of a circuit on the transfer container. The sensors can be contact or not contact.

The system further provides that a specific product is delivered from the refill container 2 to the hopper 6, to the transfer container 12 by means of an electronically and/or mechanically keyed system. This system helps to prevent mishandling, mislabeling and misapplication of, for example, highly active low use rate agrichemicals. A simpler system may be obtained by aligning the various components herein as suggested in FIG. 4 but without incorporating the mechanically and/or electronically keyed features. In this manner, the benefits of measuring and dispensing are provided. This would find use, for example, in working with only one product (without the attendant problems in confusing products and containers).

SYSTEM DESCRIPTION

Figure 6:
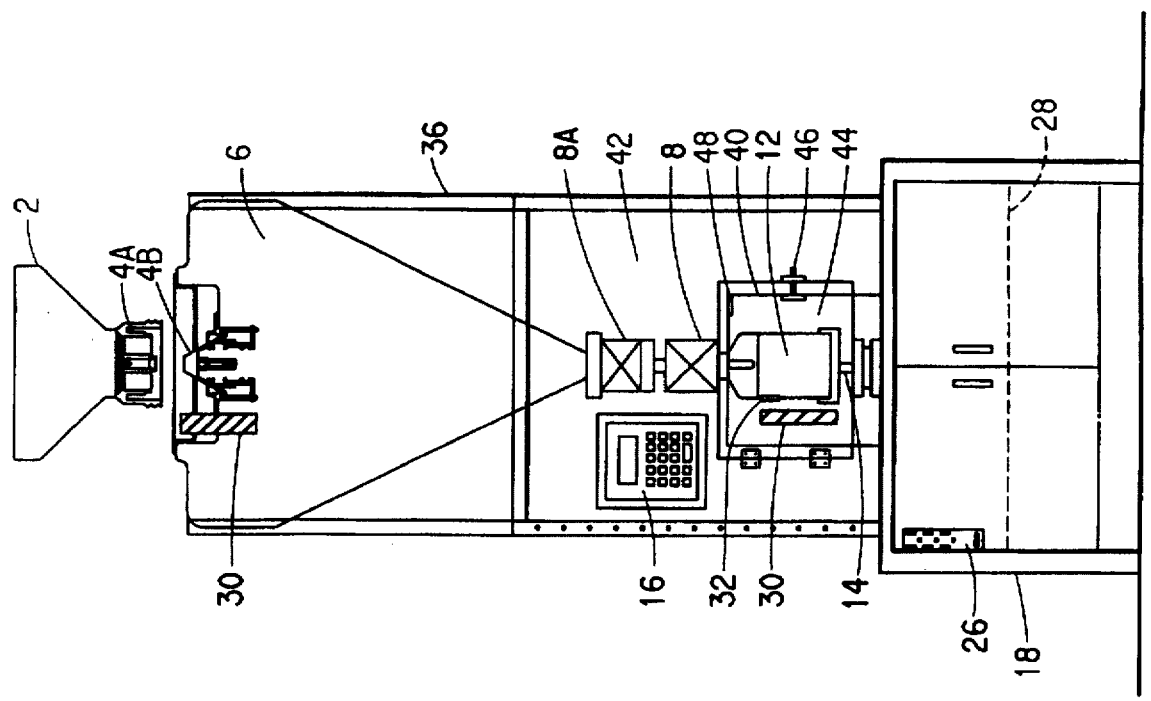
FIG. 6 is a front elevation view of a preferred embodiment of the single unit measuring and dispensing system.

The single unit system of FIG. 6 consists of a lockable storage cabinet 18 on which is mounted a housing 36. Within the lockable storage cabinet 18 is the on/off power strip 26 which controls electrical power to the system and shelves 28 to store the transfer containers 12 on. The housing 36 contains the operating components of the system. Mounted in the upper portion of the housing 36 is the hopper 6. Mounted in the top of hopper 6 is the input transfer valve 4b' and sensor 30. The refill container 2 equipped with the output transfer valve 4a' is placed on the input transfer valve 4b' to refill the hopper 6 with product. Attached to the bottom of the hopper 6 is the manual shutoff valve 8a which is connected to the dispensing valve 8 which is electronically controlled. The purpose of the manual shutoff valve 8a is to provide a means to shut off product flow if the dispensing valve 8 fails or needs to be removed for servicing or repair. The dispensing valve 8 is connected by wires (not shown) to the controller 16 and utilizes a magnetic solenoid to control product flow. Mounted in the bottom of the housing 36 is the weight measurement device 14 to receive the transfer container 12 and ensure proper alignment under the dispensing valve 8. Mounted next to the weight measurement device 14 is the sensor 30 which is used to electronically check for the correct product ID from the sensor chip 32 on the transfer container 12. Surrounding the weight measurement device 14 and sensor 30 is a sheet metal box 40 to separate them from the rest of the interior components of the system. On the front of the housing 36 is a door 42 which is lockable and constructed of sheet metal or the like. This door 42 provides secured access to the internal components of the system. Mounted in the door 42 is the controller 16. The controller 16 consists of a numeric key pad, LCD display and related electronic components. The function of controller 16 is to control the operation of the system and provide a means for inputting operational commands. It also has non-volatile memory capacity to store records (e.g. amount of product dispensed from the system). Also mounted in the door 42 is a transparent door 44 made of plexiglass or the like, which provides a means for placing the transfer container 12 on the weight measurement device 14 when engaging in a dispensing cycle. Included in the transparent door 44 mounting is a solenoid door latch 46 which engages at the beginning of a dispensing cycle and stays engaged until the cycle is completed to ensure the transfer container 12 is not removed prematurely. The transparent door 44 mounting also includes an electronic limit switch 48 which senses whether the transparent door 44 is closed or not before beginning a dispensing cycle. The dispensing cycle can not be initiated unless the transparent door 44 is closed. Mounted next to the housing 36, on top of the lockable storage cabinet 18 is a printer (not shown) which is connected to the controller 16. The printer's function is to print out a self-adhesive label which can be attached to the transfer container 12 with information on the amount of product dispensed.

SYSTEM OPERATION

To operate the system, the operator first turns on the system using the electrical on/off switch located on power strip 26. Upon power up, the system (controller 16 or computer) displays a request for a 4 digit Personal Identification Number (PIN). This number, which has been previously programmed into the system, controls access to the dispensing cycle of the system. Once the operator's PIN number has been entered, and accepted the display advances to the main operating screen. This screen provides access to the dispensing routine, a display of current hopper inventory and the update inventory routine. The update inventory routine is used when product is added to the hopper 6. Access to update inventory routine is protected by a second 4 digit PIN which can be different from the power up PIN and controls who has access to inventory updating. When the dispensing routine is selected, a "Job Number" is requested. This "Job Number", which is entered by the operator, provides unique identification for each batch dispensed. Once the "Job Number" has been entered, the display prompts the operator to place an empty transfer container 12 on the weight measurement device 14. Once this has been done and the transparent door 44 has been shut, the solenoid door latch 46 is engaged to prevent the transparent door 44 from being opened. The transfer container 12 ID is then checked by the sensor 30 to determine if the transfer container 12 product type matches the product which is in the hopper 6. If the ID is incorrect, the dispense cycle is interrupted, the solenoid door latch 46 is released and the system is returned to the beginning of the dispense cycle. If the ID matches, the cycle continues on to the tare routine which compares the tare weight of the transfer container 12 to a preset tare weigh to determine if the transfer container 12 is empty. If the transfer container 12 is not empty the dispense cycle is interrupted, the solenoid door latch 46 is released and the system is returned to the beginning of the dispense cycle. If the transfer container 12 tare weight is accepted, the operator is prompted to enter the quantity of product desired in ounces to the nearest 0.1 ounce. The screen then displays the quantity requested and prompts the operator to press the "start" button to open the dispensing valve 8 and begin the actual dispense. Product is then dispensed into the transfer container 12 until the targeted amount minus a preset quantity is reached. The system then goes into a dribble routine which dispenses very small individual batches of product into the transfer container 12 until the exact targeted amount is reached with a maximum error of ±0.5%. The system then releases the solenoid door latch 46, updates the inventory and prints out a batch ticket with the date, time, product name, amount of product dispensed, batch number, job number and 4 blank lines on it. This batch ticket is attached to the transfer container 12 when it is removed from the unit. At this point the system can be recycled to dispense another batch, left in standby mode which will automatically after a pre-set time limit require the entering of the power up PIN to access the dispensing cycle or will turn off by the on/off electrical power switch 26.

Figure 8:
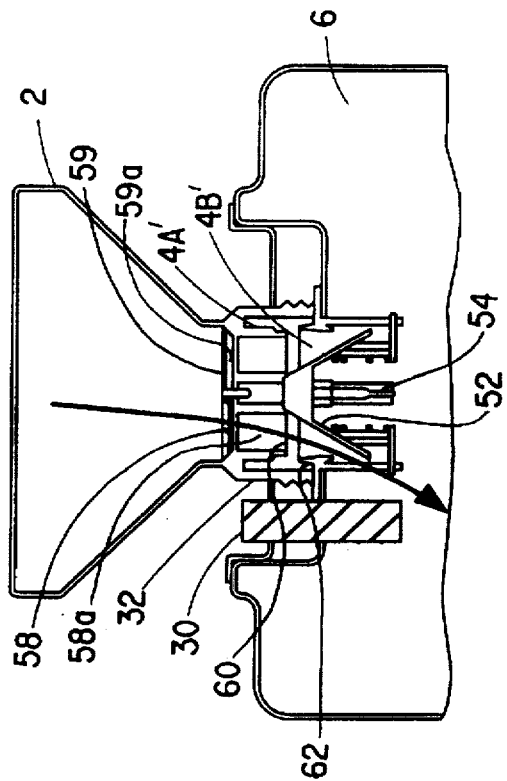
FIGS. 7 and 8 illustrate product reload of the measuring and dispensing system of FIG. 6.
Figure 7:
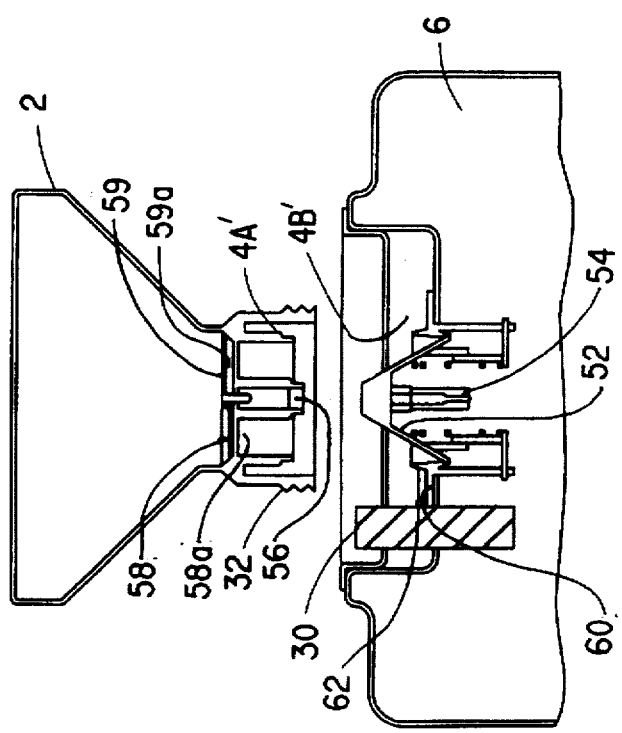

To reload the system, as described in FIGS. 7, 8, a refill container 2 with the output transfer valve 4a' is set in place on top of the hopper 6 and the input transfer valve 4b' and steadied by engaging rim 62 thereof. The weight of the container 2 pushes the spring loaded cone portion 52 of the input transfer valve 4b' open. The ID sensor 30 checks the sensor chip 32 of the refill container 2 to determine if it matches the product designation of the system. If the lid matches, a red light is illuminated on top of the sensor 30 and the magnetic solenoid 54 in the input transfer valve 4b' is energized. This solenoid entends a square key (not shown) into the keyway 56 on the output transfer valve 4a'. This key causes the bottom plate 58 having aperture 58a for product flowthrough of the output transfer valve 4a' to remain stationary when the refill container 2 is rotated. The topmost plate 59 (having aperture 59a for product flowthrough) of output transfer valve 4a' is secured to the refill container 2 so as to move only with rotation of the refill container 2. Apertures 58a and 59a are initially not in alignment. The rotation of the refill container 2 results in alignment of the openings in the top plate 60 (caused by depression of the spring loaded cone portion 52) of the input transfer valve 4b' and the apertures 58a and 59a in the bottom plate 58 and topmost plate 59, respectively of the output transfer valve 4a' so as to allow product to flow into the hopper 6. The matching of the ID also causes the product inventory of the system to be updated by the preset net weight of the refill container 2.

Figure 5:
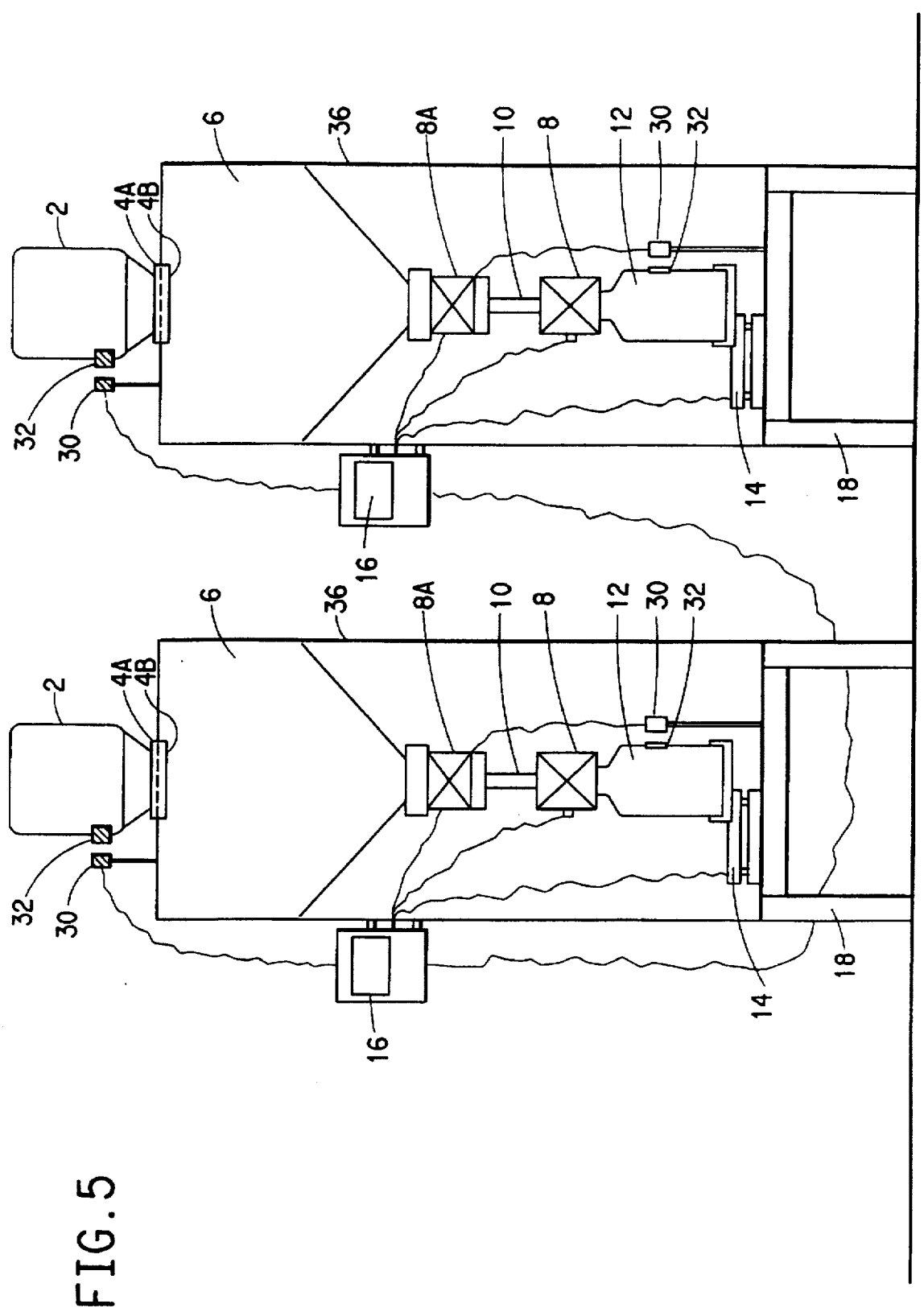
FIG. 5 is a front elevation view of multiple units of the measuring and dispensing system.

As can be seen in FIG. 5, a plurality of units can be networked together by connecting the individual unit controllers 16 to a computer which may be remotely located. In addition to the above-described features, this arrangement allows for the printing of invoices, mixing instructions for each batch, continual access to all dispensing records, and the ability for preprogramming of each individual system for the dispensing of several batches.

Solid dry flowable materials of this invention are powders, granules, or in general, solid materials which are flowable. This invention is especially useful for providing a means to transfer low use rate agricultural products in a way that minimizes spillage, accurately measures and dispenses a specific product preventing cross-contamination, provides a minimum operator exposure to the product dispensed, improves recordkeeping, labeling and inventory control.

In the above recitations, the term operator means anyone who uses the system of this invention and in the case of an agricultural product can mean a dealer, or an applicator. An environmentally closed hopper means a hopper designed in such a way as to prevent exposure to the environment of the dry flowable materials of this invention. In a similar manner, an environmentally closed refill container is a container designed in such a way as to prevent exposure to the environment. Solid dry flowable materials of this invention are powders, granules, or in general, solid materials which are flowable. Typical solid dry flowables can be, but are not limited to, agricultural products, pharmaceuticals, inorganic or organic pigments, plastics, cosmetics, foods like dehydrated dairy products, animal feeds and the like. Product specific refers to a single product.

It is understood that the above described embodiments are meant to be illustrative of the principles of this invention and not all possible embodiments of this invention.

What is claimed:

1. Apparatus for measuring and dispensing solid dry flowable materials, comprising:

a refill container having material contained therein;

a hopper connected to said refill container by a transfer valve;

a transfer container;

a control valve connected to said hopper and said transfer container to regulate materials flow therebetween; and, a weighing device supporting said transfer container;

and means for identifying both said refill container and said transfer container in order to regulate the flow of material between said refill container and said hopper, and said hopper and said transfer container, respectively.

2. The apparatus of claim 1 wherein said transfer valve further comprises:

an output transfer valve attached to said refill container and having a plurality of holes formed therein and an aperture formed therethrough for dispensing of the material into said hopper;

an input transfer valve attached to said hopper and having a plurality of pins formed thereon mating with said holes of said output transfer valve and an aperture formed therethrough for receipt of the material from said refill container;

and further wherein said output transfer valve includes a slide gate positioned within the aperture formed therethrough and which is rotatably opened to dispense product therethrough.

3. The apparatus of claim 2 wherein said transfer valve further comprises a sensor chip secured to said output transfer valve, and a sensor located proximate to said sensor chip and electronically coordinated therewith to control the release of product through said slide gate.

4. The apparatus of claim 2 wherein said weighing device is mounted on a support means and further wherein said input transfer valve, said hopper, said control valve, said transfer container and said weighing device are contained within a housing.

5. The apparatus of claim 3 wherein said sensor is selected from the group consisting of magnetic sensors, resistive sensors, radio frequency sensors, and capacitance sensors.

6. The apparatus of claim 1 wherein a manual shutoff valve is connected to said hopper and said control valve.

7. The apparatus of claim 1 wherein said transfer container further comprises a sensor chip secured thereto, and a sensor located proximate to said sensor chip and electronically coordinated therewith to control the release of product from said control valve into said transfer container.

8. The apparatus of claim 7 wherein said transfer container with said sensor chip secured thereto, said sensor, and said weighing device are contained within a sheet metal box having a door mounted thereon which is movable from an "open" position to a "closed" position, so that when said door is in the "open" position said transfer container may be removed from said sheet metal box; and, said sheet metal box and said door further are interconnected via an electronic limit switch so that material can only be dispensed into said transfer container when said door is in the "closed" position.

9. The apparatus of claim 1 wherein said transfer valve further comprises:

an input transfer valve attached to said hopper and having a cone portion with biasing means so that an aperture is formed therethrough for the receipt of material from said refill container when said refill container is mounted thereon, and a solenoid adapted to operate a movable key located within said cone portion to extend towards said refill container when said refill container is mounted thereon; and an output transfer valve attached to said refill container and having a keyway adapted to receive said key, and further having a plurality of plates with apertures formed therein and alignable for dispensing of the material through the aperture formed in said input transfer valve and into said hopper.

10. A method for measuring and dispensing solid dry flowable materials comprising:

placing a quantity of solid dry materials into a refill container;

discharging a portion of the materials therefrom through a transfer valve into a hopper;

further discharging a portion of the materials residing in the hopper through a control valve into a transfer container; and weighing the amount of materials residing in the transfer container;

wherein means is provided for identifying both said refill container and said transfer container in order to regulate the flow of material between said refill container and said hopper, and said hopper and said transfer container, respectively.

* * * * *